United States Patent [19]

Gardner et al.

[11] Patent Number: 4,837,256

[45] Date of Patent: Jun. 6, 1989

[54] CROSSLINKABLE, CRYSTALLIZABLE POLYARYLETHERS AND COMPOSITES THEREFROM

[75] Inventors: Hugh C. Gardner, Hillsborough; Ismael Colon, Piscataway, both of N.J.; Lloyd M. Robeson, Macungie, Pa.

[73] Assignee: Amoco Corporation, Chicago, Ill.

[21] Appl. No.: 96,874

[22] Filed: Sep. 15, 1987

Related U.S. Application Data

[63] Continuation-in-part of Ser. No. 847,115, Apr. 3, 1986, abandoned, which is a continuation of Ser. No. 706,250, Feb. 28, 1985, abandoned, which is a continuation of Ser. No. 604,409, Apr. 30, 1984, abandoned, which is a continuation of Ser. No. 503,576, Jun. 16, 1983, abandoned.

[51] Int. Cl.$^4$ .................... C08K 5/52; C08K 5/41; C08K 5/07; C08L 81/06
[52] U.S. Cl. .................... 524/141; 524/172; 524/359; 524/609; 524/538; 524/500
[58] Field of Search .............. 524/609, 141, 172, 359

[56] References Cited

U.S. PATENT DOCUMENTS

| | | | |
|---|---|---|---|
| 3,839,287 | 10/1974 | Kwiatkowski | 260/49 |
| 3,849,174 | 11/1974 | Ancker | 117/65.2 |
| 3,895,064 | 9/1975 | Brode | 260/571 |
| 4,108,837 | 8/1978 | Johnson | 528/126 |
| 4,108,926 | 8/1978 | Arnold | 260/874 |
| 4,200,728 | 4/1980 | Blimme | 528/174 |
| 4,292,105 | 9/1981 | Taylor | 156/242 |
| 4,306,094 | 12/1981 | Shozda | 568/637 |

FOREIGN PATENT DOCUMENTS 0067976 12/1982 European Pat. Off. .
1492366 11/1977 United Kingdom .

OTHER PUBLICATIONS

Sheppard, "Advanced Themoplastic Composite Development", 36th Annual Conference, Reinforced Plastics/Composits Institute, The Society of the Plastics Industry, Feb. 16-20, 1981, Session 17-B—pp. 1-5.
Hergenrother, "Ethynyl-Terminated Polysulfones: Synthesis & Characterization", J. Polymer Science: Polymer Chem. Ed., vol. 20, pp. 3131-3146 (1982).

*Primary Examiner*—C. Warren Ivy
*Attorney, Agent, or Firm*—Frederick S. Jerome; William H. Magidson; Ralph C. Medhurst

[57] ABSTRACT

Described herein are tough solvent resistant materials from a crystallizable, crosslinkable resin mixture comprising a particular polyarylether and a crystallization promoting plasticizer, and reinforced composites made from such resin mixture.

13 Claims, No Drawings

CROSSLINKABLE, CRYSTALLIZABLE POLYARYLETHERS AND COMPOSITES THEREFROM

REFERENCE TO RELATED APPLICATION

This application is a continuation-in-part of U.S. patent application Ser. No. 847,115, filed Apr. 3, 1986 now abandoned, which is a continuation of Ser. No. 706,250, filed Feb. 28, 1985 now abandoned, which is a continuation of Ser. No. 604,409, filed Apr. 30, 1984 now abandoned, which is a continuation of Ser. No. 503,576, filed June 16, 1983 now abandoned.

BACKGROUND OF THE INVENTION

This invention is directed to tough, solvent resistant materials derived from polyarylethers and fiber-reinforced composites made from these materials.

Composites comprised of continuous fibrous reinforcement such as graphite, aromatic polyamide fiber, and glass in a polymeric matrix are useful structural materials since they possess high specific strengths and moduli compared to metals. Such composites may be used to make load bearing structures in, for example, automobiles and aircraft.

In most graphite-reinforced composites, epoxy resin systems are used as the matrix. Since these resins are often brittle, composites made with them are subject to delamination when impacted.

To improve the impact resistance of fiber reinforced composites, a ductile thermoplastic such as the polyarylether derived from 2,2-bis(4-hydroxyphenyl)propane (i.e., bisphenol A) and dichlorodiphenyl sulfone has been used as a matrix resin. This resin affords composites with good toughness, but is attacked by many common organic solvents such as chlorinated hydrocarbons, ketones, and N,N-dimethyl acetamide. The lack of solvent resistance limits the range of applications where composites based on the resin may be used.

Recently, attempts have been made to improve the solvent resistance of the polyarylether derived from bisphenol A and dichlorodiphenyl sulfone. The polymer has been modified by attaching terminal groups which take part in chain extension and crosslinking reactions when heated. Suitable terminal groups include maleimide, nadimide, and ethynyl. Maleimide-terminated polyarylethers are described in U.S. Pat. No. 3,839,287, nadimide-terminated polyarylethers are described by C. H. Sheppard et al., 36th Annual Conference, Reinforced Plastics/Composites Institute, Feb. 16–20, 1981, Session 17-B, pages 1 to 5, and ethynyl-terminated polyarylethers are described by P. M. Hergenrother in J. Polymer. Sci., Polymer. Chem. Ed., 20, 1982, pages 3131 to 3146. All of these polyarylethers are made with bisphenol A as the aromatic diphenol. However none of these resin systems has a high degree of solvent resistance.

THE INVENTION

This invention is directed to (a) a crystallizable, crosslinkable resin comprising
(i) a polyarylether of formula I

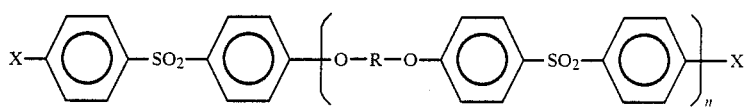

wherein
R is

or

n is 4 to 100 and x is selected from

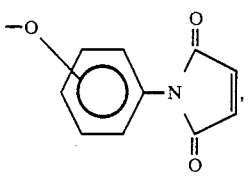

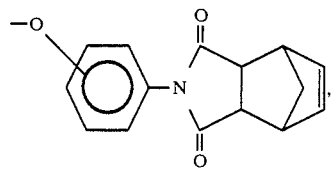

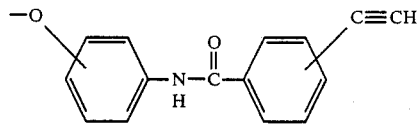

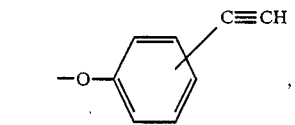

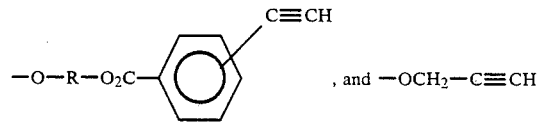

, and $-OCH_2-C\equiv CH$ (ii) a crystallization promoting plasticizer, and (b) fiber reinforced composites made using (i) plus (ii) as the matrix resin.

The compositions of this invention exhibit improved solvent resistance and environmental stress crack resistance as compared to compositions containing I derived from bisphenol A.

The fiber-reinforced composite of this invention comprise fibrous reinforcement selected from one or more of carbon or graphite fiber, aromatic polyamide fiber, glass fiber, or boron fiber.

The polyarylethers of formula I contain a backbone derived from 4,4'-dihalodiphenylsulfone and an aromatic diphenol which is primarily hydroquinone or 4,4'-bisphenol. The preferred dihalodiphenylsulfone is 4,4'dichlorodiphenylsulfone and the preferred diphenol is hydroquinone. Up to 25 percent of the diphenol, on a molar basis, may be replaced with bisphenol A, methylhydroquinone, chloro hydroquinone, bis(4-hydroxyphenyl)methane, bis(4-hydroxyphenyl)sulfide, bis(4-hydroxyphenyl)sulfone, resorcinol, or the oligomeric hydroxyl-termined polyarylethers as are described in U.S. Pat. No. 4,306,094. Up to 40 mole percent of the dihalodiphenyl sulfone may be replaced with other monomers including 4,4-dihalobenzophenones, such as 4,4-difluorobenzophenone or 4,4'-dichlorobenzophenone, or 2,6-dihalobenzonitriles, such as 2,6-dichlorobenzonitrile.

The terminal groups on I are selected from

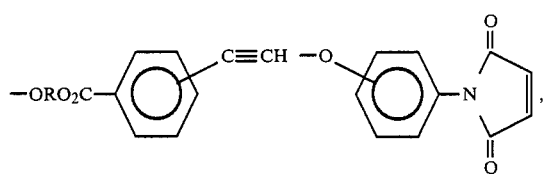

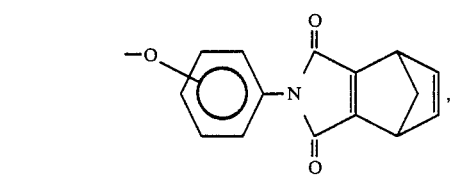

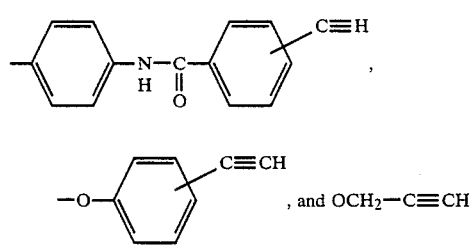

Each undergoes chain extension and crosslinking reactions upon application of heat. The method of preparation of I depends on X.

If —X is

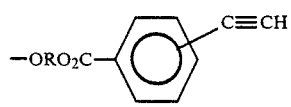

it may be prepared by a two step process comprising (i) preparation of a hydroxyl-terminated polyarylether by the condensation of a molar excess of an aromatic diphenol with dichlorodiphenylsulfone at a temperature of from about 100° C. to about 220° C. in the presence of base in a dipolar aprotic solvent. Suitable process conditions are described in U.S. Pat. Nos. 4,108,837 and 4,200,728 and in British Pat. No. 1,492,366, and (ii) esterification of the terminal hydroxyl groups with an ethynyl-substituted benzoyl chloride in the presence of an acid acceptor. Either m-ethynyl benzoyl chloride or p-ethynyl benzoyl chloride may be used. Triethylamine is a suiable acid acceptor. Suitable solvents include N-methylpyrrolidinone, tetrahydrofuran, methylene chloride or mixtures thereof.

The general procedure for carrying out the synthesis of polyarylethers where X=

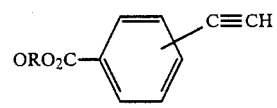

is given in J. Polymer Sci., Polymer. Chem. Ed., 20, 1982, pages 3131 to 3146.

If X is

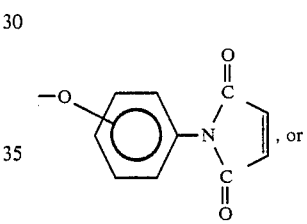

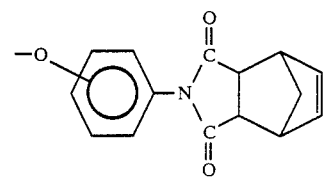

the polyarylether of formula I may be prepared by a process comprising (i) preparation of an amine-terminated polyarylether by condensing an aminophenol, dihalodiphenylsulfone, and an aromatic diphenol at elevated temperature in the presence of base in a dipolar aprotic solvent, (ii) addition of maleic anhydride or nadic anhydride, i.e., 5-norbornene-2,3-dicarboxylic anhydride, to the terminal amine groups to form a diamic acid followed by (iii) imidization of the amic acid groups by heat or by addition of a dehydrating agent such as acetic anhydride.

This process is Process A. The conditions for steps (i) through (iii) are given in U.S. Pat. No. 3,839,287. Alternatively, step (i) may be carried out using the process conditions of U.S. Pat. No. 3,895,064 or British Pat. No. 1,492,366.

The steps in Process A are outlined in Scheme I using p-aminophenol, hydroquinone, and nadic anhydride.

Scheme I

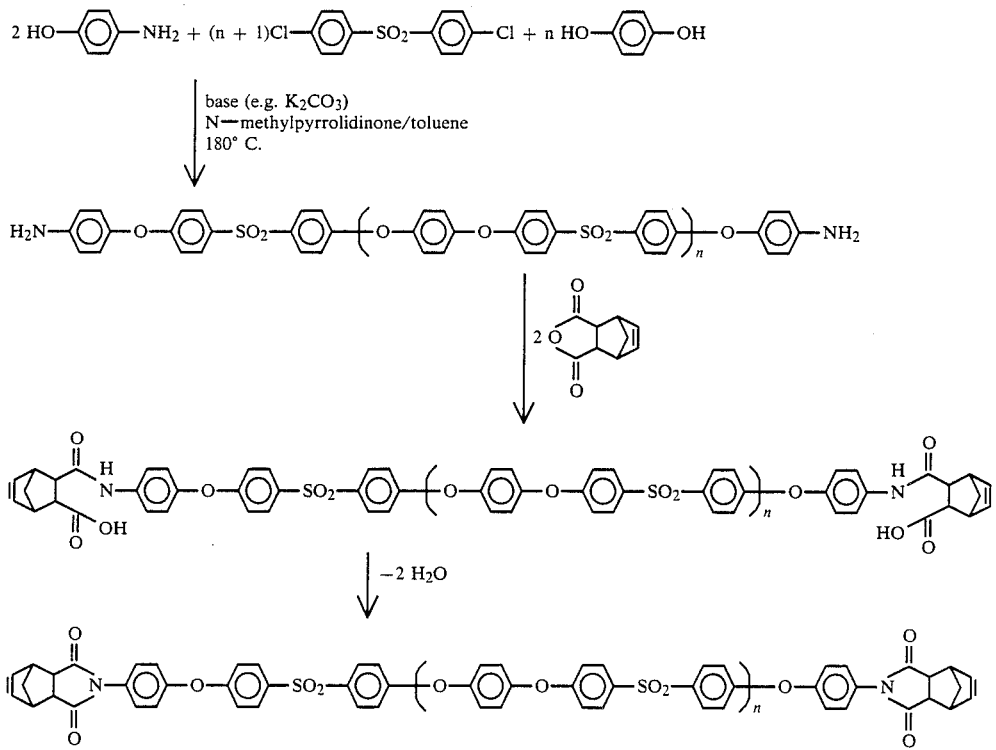

The molecular weight of the amine-terminated polyarylether intermiediate is controlled by the molar ratio of the aminophenol to aromatic diphenol. The amount of dihalodiphenyl sulfone used is such that there are from 0.95 to 1.05 moles of activated halide per mole of hydroxyl group. Either m-aminophenol or p-aminophenol may be used.

If X is

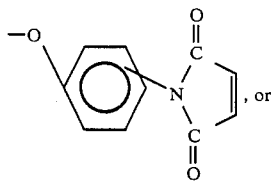, or

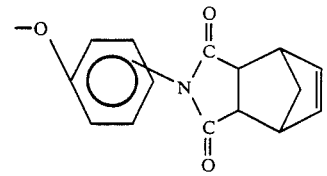

an alternate procedure (i.e., Process B) for the preparation of I may be used. This process comprises (i) formation of a hydroxyl-containing imide from an aminophenol and either maleic anhydride or nadic anhydride, and (ii) condensation of dihalodiphenylsulfone, aromatic diphenol, and the product from (i) at a temperature of from about 100° to about 180° C. in a dipolar aprotic solvent in the presence of base. The conditions for this step are similar to those for the preparation of the amine-terminated polyarylether in step (i) of Process A.

Process B is illustrated in Scheme II using p-aminophenol, hydroquinone, and nadic anhydride. The synthesis of the hydroxyl-containing imide is described in the publication by C. H. Sheppard et al. described, supra.

Scheme II

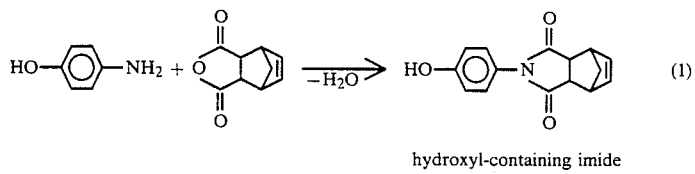

hydroxyl-containing imide

Scheme II

-continued

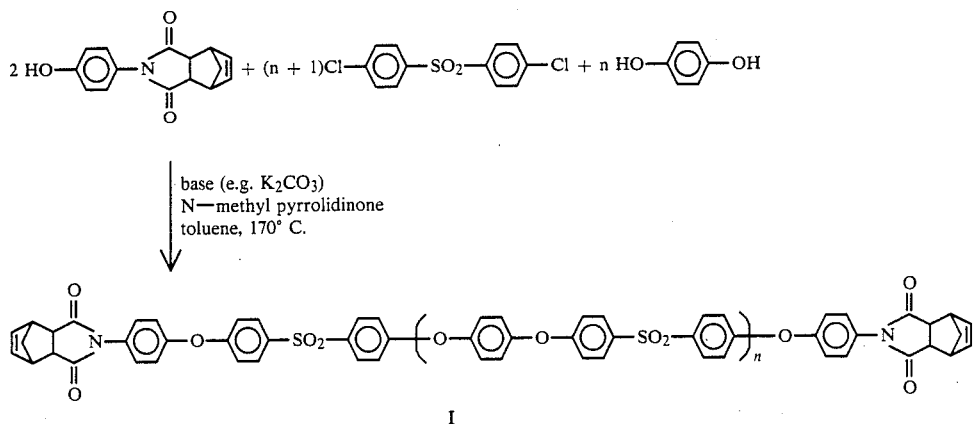

I

If —X is

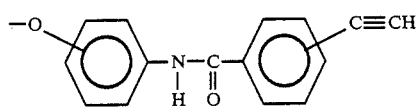

the polyarylether of formula I may be synthesized by a process comprising (i) preparation of an amine-terminated polyarylether by condensing an amino phenol, dihalodiphenylsulfone, and an aromatic diphenol in the presence of base in a dipolar aprotic solvent at a temperature of 100° to 210° C., followed by (ii) amidation of the terminal amine groups with m- or p-ethynyl benzoyl chloride in the presence of an acid acceptor at −20° C. to 50° C. In some cases, the reaction solvent may serve as the acid acceptor.

A preferred solvent for the preparation of I where X

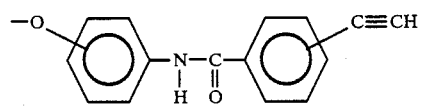

is N-methylpyrroli-dinone, since it can be used in both steps i and ii.

If X is

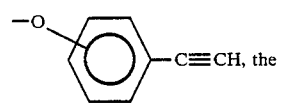

polyarylether of formula I may be prepared by condensing the aromatic diphenol, dihalodiphenylsulfone, and the ethynyl phenol

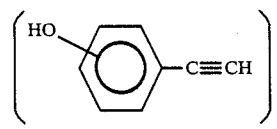

a dipolar aprotic solvent at 70° to 200° C. in the presence of base. The synthesis of m-ethynyl phenol is described in U.S. Pat. No. 4,108,926.

If X is

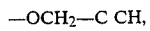

—OCH$_2$—C CH, the polyarylether of formula I may be prepared by condensing the aromatic diphenol, dihalodiphenyl-sulfone, and propargyl chloride in a dipolar aprotic solvent in the presence of base. Preferably, propargyl chloride is added subsequent to the formation of a hydroxyl-terminated polyarylether from the dihalodiphenyl-sulfone and an excess of aromatic diphenol.

In the composition, the crystallization promoting plasticizer induces crystallinity in the polyarylether backbone of I upon application of heat.

The crystallization promoting plasticizers are of two types. The first type does not react with the polyarylether of formula I and is characterized by solubility with the polyarylether, a glass transition temperature of <30° C., low volatility (e.g. boiling point >300° C.), and excellent thermal stability. The second type reacts with the polyarylether of formula I and may optionally react with itself and is characterized by a glass transition temperature of <70° C. and a boiling point of >200° C. Examples of the first type are triarylphosphate esters, poly(phenylene oxides) of the formula

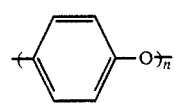

wherein n=2 to 15,
4,4'dichlorodiphenysulfone, 4,4'dichlorobenzophenone, other substituted diphenyl sulfones or benzophenones as well as substituted diphenylethers, and mixtures thereof. Suitable plasticizers of the second type include 4,4'-bis(3-ethynylphenoxy)diphenyl sulfone, triallyl cyanurate, and diallyl phthalate, triallyl trimellitate, the biscyanate of bisphenol A, diamino diphenyl methane, 1-amino-3-ethynylbenzene, 1-hydroxy-3-ethynylbenzene, 2,2'-bis(3-ethynyl-phenoxy-4-phenyl)propane, divinyl adipate, divinylether of 1,4-butanediol, N-phenylmaleimide, bismaleimide of 4,4'-diaminodiphenyl methane, N-vinyl-2-pyrrolidinone, and mixtures thereof.

The crystallizable, crosslinkable compositions of this invention (i.e., i and ii plus the plasticizer) may be prepared by mixing the components at a temperature of from about 100° C. to about 350° C. in conventional polymer compounding equipment such as a Banbury mixer or extruder. Preferably the mixing time is short and the mixing temperature low to minimize premature crosslinking. An inert gas atmosphere is preferred when compounding the ethynyl-terminated polyarylethers.

An alternative method for combining I and the crystallization promoter is to dissolve or disperse them in a liquid such as N-methyl pyrrolidinone, N,N-dimethylacetamide, methylene chloride, tetrahydrofuran, sulfolane, or mixtures thereof. The liquid may be removed by evaporation or by pouring the mixture into a liquid which dissolves the carrier but neither I nor the crystallization promoter. For many mixtures in N-methylpyrrolidinone or N,N-dimethylacetamide, precipitation in water is satisfactory. A solid mixture of I and the promoter can then be recovered by filtration, dried and cured.

Compositions with improved solvent resistance are prepared by heating the mixture of I and the crystallization promoter at a temperature of from about 100° C. to about 350° C. The time and temperature depend on the level of solvent resistance desired. The preferred temperature is above the glass transition temperature of the mixture and below the melting point of pure I.

The fiber reinforced composites of this invention are fabricated using techniques know in the art. For example thin films of the mixture of I and the crystallization promoter may be prepared and interleaved between plies of fibrous reinforcement in the form of woven cloth of unidirectional tape. A laminate may be prepared by heating this mass in a heated press. Alternatively, composites may be prepared from prepreg-an intimate mixture of I and the crystallization promoter with the fibers. Prepreg may be made by drawing the fibers through a heated bath containing I, the crystallization promoter, and a solvent, followed by evaporation of the solvent by the application of heat.

Other processes include applying a slurry containing I and the crystallization promoter to a reinforcement prior to heating and compaction, as described in, for example, U.S. Pat. No. 4,292,105. Preimpregnated reinforcement as well as laminated sheet may be prepared using heated calendar rolls as described in, for example, U.S. Pat. No. 3,849,174.

The number average molecular weight of the polyarylether of formula I, is from about 2,000 to about 30,000, preferably from about 2,500 to about 25,000, and most preferably from about 5,000 to about 20,000. The polyarylethers of formula I are solids which melt or soften below 380°.

The compositions of this invention (I plus the crystallization promoter) may be used with or without reinforcement. In the absence of reinforcement they contain up to 50 percent by weight of the crystallization promoter. In reinforced compositions, the amount of I is from about 10 to about 90 percent by weight, the amount of crystallization promoter is from 0.5 to about 25 percent by weight and the amount of reinforcement is from about 5 to about 85 percent by weight, said weight percent being based upon the total weight of the composition. They may be extruded, compression molded, and injection molded. They may also be used as films, coatings, adhesives, and sealants. They may be combined with particulate fillers such as carbon black, talc, mica, and calcium carbonate. Chopped fibers and continuous filaments may be used.

Suitable reinforcements have a melting point or decomposition point above 200° C. and include one or more of alumina, titania, silicon carbide, silicon boride, polybenzothiazole as well as the reinforcements listed above.

Crosslinking may be carried out with the aid of free radical initiators or radiation. Suitable initiators include dicumyl peroxide, di-t-butylperoxide, 1,1,2,2-tetraarylethanes, 1,1,1,2,2-pentaarylethanes and the like.

EXAMPLES

The following examples serve to give specific illustrations of the practice of this invention buy they are not intended in any way to limit the scope of this invention.

Example 1

A 1 liter 4-neck flask equipped with a mechanical stirrer, thermometer, addition funnel, nitrogen purge line, a Dean-Stark trap and condenser was charged with 129.22 g. of dichlorodiphenysulfone, 48.45 g. of hydroquinone, 2.21 g. of p-aminophenol, 80.85 g. of potassium carbonate, 137 ml. of chlorobenzene and 368 ml. of sulfolane. This mixture was purged with nitrogen for one-half hour at room temperature (about 25° C.) while stirring. It was then heated to 210° C. as chlorobenzene and the chlorobenzene-water azeotrope were distilled from the mixture. The temperature was maintained at 210° C. for two hours by the dropwise addition of 180 ml of chlorobenzene. The reaction mixture, which now contained an amine-terminated polyarylether, was cooled to 170° C. and 3.94 g. of nadic anhydride was added. After two hours at a temperature of 160 to 170° C., the mixture was poured into a foil-lined pan and allowed to cool. Once the reaction product had solidified, it was broken and washed in a blender with 2 liters of deionized water. The insoluble material was recovered by filtration and was washed with three portions (500 ml.) of deionized water. After it was slurried in 2 liters of methanol, it was dried under a vacuum. The isolated yield of product was 145 g. Infrared analysis indicated that the product was a nadimide-terminated polyarylether which had a reduced viscosity of 0.50 as measured in N-methylpyrrolidinone at 25° C. at a concentration of 0.2 g/dl.

Control A

The following materials were added to the reaction flask:

43.9 g. of phenoxynadimide, 85.3 g. of bisphenol A, 110.07 g. of dichlorodiphenylsulfone, 55.6 g. of potassium carbonate, and 760 ml. of a mixture of dimethylacetamide and toluene. The contents were heated at 140° C. for 72 hours.

The reaction product had a reduced viscosity of 0.50 as measured in N-methylpyrrolidinone at 25° C. at a concentration of 0.2 g/100 ml.

Example 2

Preparation of molded plaques and solvent testing

When cured at 250° C. for several hours molded pieces of the material of Example 1 were totally unaffected by immersion in either methylene chloride or dimethylacetamide, while pieces molded from the material of Control A swelled tremendously in these solvents, when cured under the same conditions.

This result shows the improved solvent resistance of the composition of this invention with hydroquinone as the diphenol in the polyarylether backbone as compared to Control A which is based on bisphenol A. However, further improvements particularly in regard to environmental stress crack resistance is desirable and a means for achieving this is shown in Examples 3 and 4.

| Solvent Resistance of Nadimide - Terminated Polymers | | |
|---|---|---|
| Sample[1] | Cure Conditions | Effect of Solvent[2] |
| Control A | 2 hrs. @ 250° | swells greatly |
| Products | " | unaffected |
| of Ex 1 | " | unaffected[3] |

[1] 2 × 2 cm strips cut from 4" × 4" × 10 mil plaque molded at 275° C. @ 4000 psi.
[2] Solvent was methylene chloride unless indicated otherwise.
[3] N,N—dimethylacetamide

Control B

Environmental Stress Crack Resistance of a molded plaque made from the Product of Example 1

The material from example 1 was heated to 310° C. and compression molded into a 4"×4"×20 mil plaque and allowed to further react for two hours at 250° C. This was followed by an annealing step of 2 hours at 200° C. The resultant material was tested for environmental stress crack resistance to acetone and methyl ethyl ketone. The time to rupture results were 2 seconds in methyl ethyl ketone and 3 seconds in acetone when subjected to a stress of 1000 psi.

Modulus - temperature data were obtained on the material described in this example which had been molded and heated for two hours at 250° C. but not annealed at 200° C. The modulus-temperature data revealed an amorphous product with no crystalline modulus plateau. The measured 1% secant modulus values at 200° C., 225° C., 250° C. respectively were 200 psi, 46 psi, and 8 psi. Calorimetric data were obtained by heating to 400° C. at 10° C./min. under $N_2$ on the DuPont/990 Thermal Analyzer. No evidence for crystallinity was obtained.

Example 3

Environmental Stress Crack Resistance of Mixtures of the Product of Example 1 and a Crystallization Promoter The material from example 1 (8.5 grams) was slurried with an acetone solution containing 1.5 grams of triphenylphosphate. After devolatilization of acetone, the material was heated to 310° C. and compression molded into a 4"×4"×20 mil plaque and then allowed to further react for two hours at 250° C. This was followed by an annealing step of 2 hours at 200°. The resultant material was tested for environmental stress cracks resistance to acetone and methyl ethyl ketone. The time to rupture results were 0.08 hours in methyl ethyl ketone and 0.12 hours in acetone when subjected to a stress of 1000 psi.

Modulus - temperature data were obtained on the materials described in this example which had been molded and heated for two hours at 250° C. but not annealed at 200° C. Modulus-temperature data revealed a semi-crystalline product with distinct crystalline modulus plateau. The measured 1% secant modulus values at 200° C., 225° C., and 250° C. respectively were 8,650 psi; 7,870 psi; and 4,970 psi. The crystalline melting point determined from the modulus-temperature data was 280° C. Calorimetric data were obtained by heating to 400° C. at 10° C./min under $N_2$ on the DuPont 990 Thermal Analyzer. Crystallinity was present. The crystalline melting point was 272° C. and the heat of fusion was 6.5 cal./gr.

Example 4

The material from example 1 (8.0 grams) was slurried with an acetone solution containing 2.0 grams of triphenyl phosphate. After devolatilization of acetone, the material was heated to 310° C. and compression molded into a 4"×4"×20 mil plaque and allowed to further react for two hours at 250° C. This was followed by an annealing step of 2 hours at 200° C. The resultant material was tested for environmental stress crack resistance to acetone and methyl ethyl ketone. The time to rupture results were 2.13 hours in methyl ethyl ketone. Time to rupture results were 2.13 hours in methyl ethyl ketone and 1.20 hours in acetone when subjected to a stress of 1000 psi.

Modulus-temperature data were obtained on the material described in this example which had been molded and heated for two hours at 250° C. but not annealed at 200° C. Modulus-temperature data revealed a semi-crystalline product with a distinct crystalline modulus plateau. The measured 1% secant modulus values at 200° C., 225° C., and 250° C. respectively were 9,340 psi; 8,100 psi; and 6,000 psi. The crystalline melting point determined from the modulus-temperature data was 285° C. Calorimetric data were obtained by heating to 400° C. at 10° C./min under $N_2$ on the DuPont 990 Thermal Analyzer. Crystallinity was present. the crystalline melting point was 283° C. and the heat of fusion was 7.5 cal./gr.

The results of Examples 3 and 4 indicate that plasticization of the polymer of Example 1 leads to an improvement in the environmental stress crack resistance.

What is claimed is:

1. A crystallizable, crosslinkable resin mixture comprising:

(i) a polyarylether of the following formula:

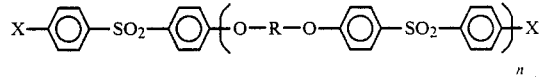

wherein
R is

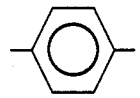

or

n is 4 to 100 and X is selected from

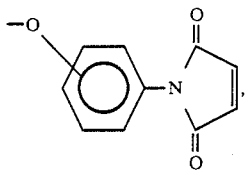

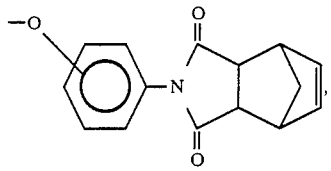

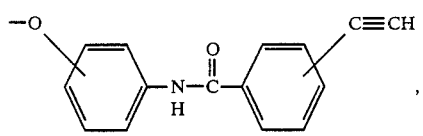

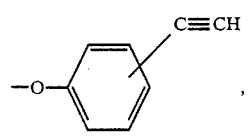

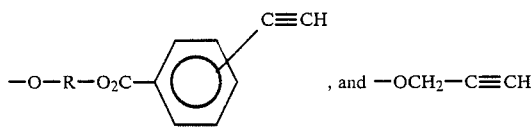

and, (ii) a crystallization promoting amount of a plasticizer having a boiling point of at least about 300° C. at about one atmosphere, a glass transition temperature of less than about 30° C., and solubility with the polyarylether selected from triarylphosphate esters, 4,4'-dichlorodiphenylsulfone, 4,4'-dichlorobenzophenone, or mixtures thereof in an amount of up to 50 percent by weight based upon the total weight of the mixture.

2. A composition comprising:
(a) the resin mixture as defined in claim 1, and
(b) a reinforcement selected from one or more of carbon or graphite fiber, aromtic polyamide fiber, glass fiber, boron fiber, alumina, titania, silicon carbide, silicon boride, and polybenzothiazole.

3. A composition as defined in claim 1 wherein the polyarylether in the resin mixture is present in amounts of from about 10 to about 90 percent by weight based on the total weight of the composition.

4. A composition as defined in claim 1 wherein the crystallization promoting plasticizer in the resin mixture is present in amounts of from 0.5 to about 25 percent by weight based on the total weight of the composition.

5. A composition as defined in claim 2 wherein the reinforcement is present in amounts of from about 5 to about 85 percent by weight based on the total weight of the composition.

6. A composite comprising:
(a) the crosslinked resin mixture as defined in claim 1, and
(b) a reinforcement selected from one or more of carbon or graphite fiber, aromatic polyamide fiber, glass fiber, boron fiber, alumina, titania, silicon carbide, silicon boride, and polybenzothiazole.

7. A crystallizable, crosslinkable resin mixture comprising:
(i) a polyarylether of the following formula:

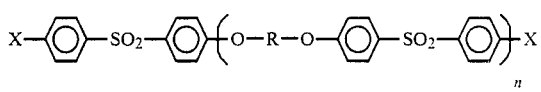

wherein
R is

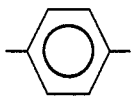

or

n is 4 to 100 and X is selected from

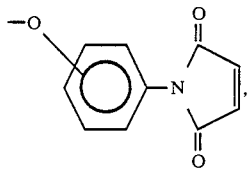

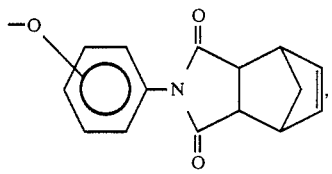

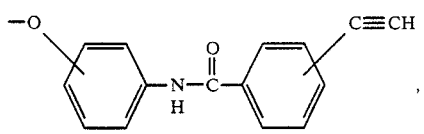

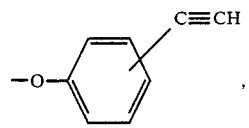

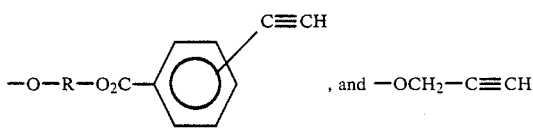

and, (ii) a crystallization promoting amount of a plasticizer having a boiling point of at least about 300° C. at about one atmosphere, a glass transition temperature of less than about 30° C., and solubility with the polyarylether selected from triarylphosphate esters, or mixtures thereof in an amount of up to 50 percent by weight based upon the total weight of the mixture.

8. The mixture of claim 7 wherein the triarylphosphate ester is triphenylphosphate.

9. A composition comprising:
(a) the resin mixture as defined in claim 7, and
(b) a reinforcement selected from one or more of carbon or graphite fiber, aromatic polyamide fiber, glass fiber, boron fiber, alumina, titania, silicon carbide, silicon boride, and polybenzothiazole.

10. A composition as defined in claim 7 wherein the polyarylether in the resin mixture is present in amounts of from about 10 to about 90 percent by weight based on the total weight of the composition.

11. A composition as defined in claim 7 wherein the crystallization promoting plasticizer in the resin mixture is present in amounts of from 0.5 to about 25 percent by weight based on the total weight of the composition.

12. A composition as defined in claim 9 wherein the reinforcement is present in amounts of from about 5 to about 85 percent by weight based on the total weight of the composition.

13. A composition comprising:
(a) the crosslinked resin mixture as defined in claim 7, and
(b) a reinforcement selected from one or more of carbon or graphite fiber, aromatic polyamide fiber, glass fiber, boron fiber, alumina, titania, silicon carbide, silicon boride, and polybenzothiazole.

* * * * *